United States Patent [19]

Rood, Jr.

[11] 4,351,476
[45] Sep. 28, 1982

[54] AIR FILTERING SYSTEM AND METHOD OF OPERATION

[76] Inventor: William E. Rood, Jr., 1195 S. Idaho Rd., Apache Junction, Ariz. 85220

[21] Appl. No.: 208,701

[22] Filed: Nov. 20, 1980

[51] Int. Cl.³ .................. F24D 5/04; B01D 46/42; F24F 3/16

[52] U.S. Cl. .................. 237/50; 98/33 A; 165/50; 55/97; 55/274; 55/385 A; 55/313; 55/412; 55/470; 55/480

[58] Field of Search .............. 55/97, 274, 276, 279, 55/350, 385 A, 411, 412, 415, 419, 470, 480, 482, 483, 493, 313; 165/22, 50; 237/50; 98/33 A, 40 R, DIG. 7, DIG. 10

[56] References Cited

U.S. PATENT DOCUMENTS

| | | | |
|---|---|---|---|
| 1,916,908 | 7/1933 | Stacey, Jr. et al. | 98/33 A |
| 2,507,057 | 5/1950 | Solberg | 98/33 A |
| 2,767,639 | 10/1956 | Johnson et al. | 98/33 A |
| 2,825,500 | 3/1958 | McLean | 55/470 |
| 3,139,020 | 6/1964 | Schemenauer | 98/38 C |
| 3,163,100 | 12/1964 | McGrath | 98/39 |
| 3,165,625 | 1/1965 | Potter | 165/59 |
| 3,259,178 | 7/1966 | Tarnoff | 165/39 |
| 3,263,743 | 8/1966 | Baumgarten | 165/40 |
| 3,693,705 | 9/1972 | Stotz | 165/50 |
| 3,789,621 | 2/1974 | Inuzuka | 165/22 |
| 3,828,530 | 8/1974 | Peters | 55/482 |
| 3,936,284 | 2/1976 | Mason | 55/385 A |

FOREIGN PATENT DOCUMENTS 2556020 6/1976 Fed. Rep. of Germany ........ 55/482

Primary Examiner—David L. Lacey
Attorney, Agent, or Firm—Cahill, Sutton & Thomas

[57] ABSTRACT

An air filtering unit for blowing only filtered air into a room of a building having a central air conditioning air duct outlet therein, includes an electric blower unit having an air inlet and an air outlet. An air guide system conducts all air flowing through the duct outlet into the air inlet of the blower unit. A filter disposed between the air duct outlet and the air inlet of the blower unit filters all air flowing into the blower unit. Air flowing through the outlet of the blower unit is directed into the room in which the air filtering unit is installed or is directed by means of a tubular conduit back through the central air conditioning duct to an outlet duct into another room. The air filtering unit is mounted in a housing disposed over the air duct outlet and has a door which can be opened to expose the filter to facilitate removal and replacement of the filter.

15 Claims, 9 Drawing Figures

AIR FILTERING SYSTEM AND METHOD OF OPERATION

BACKGROUND OF THE INVENTION

1. Field of the Invention

The invention relates to air filtering systems and, more particularly, to air filtering systems for filtering all of the air entering a particular room of a building having a central air conditioning system.

2. Description of the Prior Art

Many people suffer from allergies due to various dusts, pollen, molds, and other common allergy producing substances which are carried in air at various times of the year in various parts of the country. Such allergy causing particles are believed to settle in and become lodged in a person's sinus and nasal passages while the person sleeps at night to much greater extent than such particles become lodged in the sinus passages at any other time. The most severe allergic reactions a person has are therefore believed to be caused by allergy causing particles which are suspended in the air in the room in which the person sleeps. The allergic reactions frequently cause irritation and swelling of the sinus membranes, often making breathing more difficult and causing large amounts of sinus drainage. The irritated membranes and sinus tissue which result from the allergic reaction are believed to frequently cause the person to become more susceptible to other diseases, such as common colds, and frequently tend to aggravate other conditions, with overall detrimental effects on the person's health. Although expensive air filtering systems have been utilized to provide air having a high degree of purity in certain environments, such as in operating rooms and hospitals and in certain industrial manufacturing areas in which extremely pure air is required, such air filtering systems are excessively expensive and are not suitable or feasible for use in an average family residence. One such air purification system is disclosed in U.S. Pat. No. 3,150,584 and another is shown in U.S. Pat. No. 3,782,265. Both of the systems disclosed in the above-mentioned patents are unduly expensive to be suitable for use in an average residence. Thus, there is an unmet need for an inexpensive air filtering system which is capable of being utilized in a typical residence having a central air conditioning system to provide pure air sleeping environments for persons having allergic reactions to particles carried by unfiltered air.

Accordingly, it is an object of the invention to provide a low cost air filtering system and method for providing filtered air flow into a particular room of a typical residence having a conventional central air conditioning system.

It is another object of the invention to provide a low noise, low cost air filtering system and method for providing a flow of filtered air into a particular room of a building having a central air conditioning system.

It is another object of the invention to provide a low cost filtering and method which utilizes a replaceable low cost filter system.

Most central air conditioning have cooling or heating elements therein and also a blower system which is periodically turned on and off as the temperature within the residence increases above and falls below a preset desired temperature in order to maintain an average temperature equal to a preset temperature. Most such conventional air conditioning systems have a simple filter located at an air intake of the main duct of the air conditioning system. Such filters are replaceable and inexpensive, but do not adequately remove enough of the above-mentioned allergy producing particles carried by the air to alleviate the allergic reaction suffered by persons having severe allergy problems as they sleep in the bedrooms of their residences. Further, even if an expensive air filtering system of the various types which are commercially available is utilized in the allergic person's bedroom, when the air conditioning system turns "on"; a large quantity of air carrying allergy particles is blown into the person's bedroom.

Accordingly, it is another object of the invention to provide an inexpensive air filter system for filtering all air which enters a particular room of a building and for preventing unfiltered air from entering that room, regardless of whether the central air conditioning system of the building is operating.

Some commercially available air filtering systems are only capable of filtering the air in a particular room, such as a bedroom, of a house. Such filtering systems simply continuously recirculate and refilter the air in a particular room of the house, thereby providing reasonably pure air in that room. However, they do not significantly reduce the level of air pollutants in other portions of the building or house. Consequently, every time a door of the room in which such a filtering system is utilized is opened, a large quantity of polluted air enters the room.

Accordingly, it is another object of the invention to provide a low cost filtering system and method which effectively reduces the concentration of pollutants in air throughout a building in addition to providing highly purified air in a particular room of the building.

Other U.S. patents which disclose various prior air filtering systems includes U.S. Pat. Nos. 2,825,500; 3,139,020; 3,163,100; 3,165,625; 3,259,178; and 3,263,743. None of the air filtering systems disclosed in the immediately foregoing references disclose any system which is capable of being incorporated into or operating in conjunction with a typical central air conditioning system in a residence to accomplish the objective of inexpensively filtering substantially all air entering into a particular room of the residence, regardless of whether the central air conditioning system is operating, to prevent air carrying allergy causing particles from entering into the room through doors or windows of the room.

A variety of conventional smoke alarm systems are widely available. However, such smoke alarm systems have a shortcoming that no matter where they are located in a particular residence, they are located a long distance from certain points of the residence. Smoke being generated in locations of the residence distant from the smoke alarm devices may require a long time to reach the smoke alarm device, especially if the air circulation system is inoperative, allowing the fire causing the smoke to spread.

Accordingly, it is another object of the invention to provide a smoke alarm system for use in conjunction with an air filtering system for more rapidly indicating presence of smoke anywhere in a building than prior smoke alarm systems.

SUMMARY OF THE INVENTION

Briefly described, and in accordance with one embodiment thereof, the invention provides an air filtering system and method for continually producing a flow of filtered air into a particular room of a building and for preventing air carrying allergy causing particles, such as dust, pollen and the like, or other particles from entering into the room regardless of whether or not a blower of a central air conditioning system of the building is operating to blow air through a central air duct into various rooms of the building. The air filtering system also prevents any air except filtered air from entering the particular room regardless of whether the air conditioning system is operating. In one of the described embodiments of the invention, the air filtering system includes an electric blower unit having an air inlet and an air outlet. The electric blower unit is supported within a housing mounted over an air outlet leading from the main duct of the air conditioning system into the room. Air is drawn from the air duct outlet through a replaceable filter element into the air inlet of the blower unit and out of the air outlet of the blower unit. In one embodiment of the invention, the housing has a front door which can be opened to expose the replaceable filter element. The air outlet of the blower unit blows air into the interior of the room at all times, thereby providing increased air pressure in the room compared to air pressure in a hallway into which a door of the room opens, regardless of whether the blower of the central air conditioning system is operating or not. The increased air pressure in the room continually prevents air carrying allergy causing particles and the like from entering the room through the doorway or windows of the room.

In another embodiment of the invention, the outlet of the blower unit is coupled by means of a tube extending into the main duct of the central air conditioning system through the duct outlet to a duct outlet of a remote room, whereby filtered air is blown into the remote room, all other air in the central air conditioning duct being blocked from entering the remote room. This provides filtered air and increased air pressure in the remote room without the inconvenience of noice produced by the blower unit.

In an embodiment of the invention, the tube extends from the outlet of the blower unit through the direct outlet a distance into the main duct and loops back to return through the duct outlet into the housing in which the blower unit is contained and to the air outlet of the air filtering system. Noise produced by the blower unit is muffled as a result of blowing of the filtered air through the length of the tube extending into the main air duct. Consequently, the housing containing the filter and the blower unit can be installed in the same room in which the filtered air is desired without the result of undue noise annoying an occupant of that room.

In another embodiment of the invention, a plurality of absolute filters are provided in the housing. A pre-filter is disposed in front of the absolute filters. The air drawn through the pre-filter and the absolute filters enters the air inlet of the blower unit and passes out of the air outlet of the blower unit into the room in which filtered air is desired, either directly or via a tubular conduit to a remote room.

In one embodiment of the invention, a conventional smoke alarm unit is disposed in the housing on the air duct outlet side of the filtered element. The smoke alarm quickly receives smoke generated anywhere in the building, regardless of whether the blower of the central air conditioning unit is operating because the blower unit of the air filter system continually draws air into the main duct of the central air conditioning system even if the blower unit of the air conditioning system is not operating. If the blower of the central air conditioning system is operating, any smoke generated in the house is rapidly drawn into the air intake of the central air conditioning system, through the main duct and into the housing of the air filtering system. A separate smoke alarm unit is disposed on the outside of the housing in the room in which the filtered air is desired to detect rapidly any smoke generated in that room. In one embodiment of the invention, a blower unit support hingeable connected to the outlet duct of the air conditioning system swings outward from the air duct to expose the replaceable filter element.

DESCRIPTION OF THE INVENTION

Figure 1:
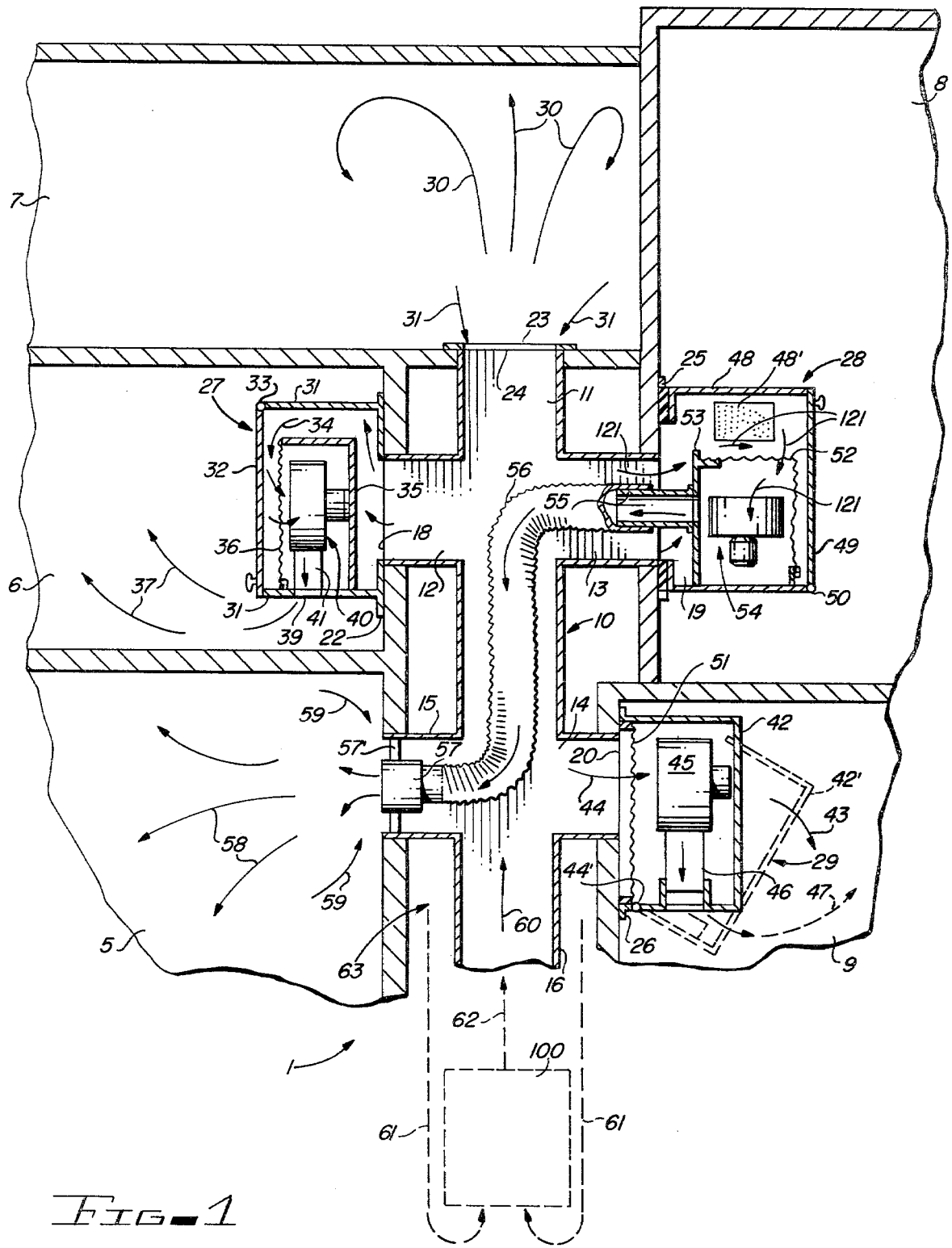
FIG. 1 is a floor section view diagram of a building illustrating three (3) different embodiments of the air filtering system of the present invention in a single building having a central air conditioning system.

Referring now to FIG. 1, building 1 includes a plurality of separate rooms 5, 6, 7, 8 and 9, each adjoining a common hallway 63. The building includes a central air conditioning system having a main duct 10 which has duct outlets 15, 12, 11 and 14 opening into rooms 5, 6, 7, 8 and 9, respectively. It should be noted the term "central air conditioning system" as used herein is intended to include any systems which circulate air through a main duct into rooms of a building, regardless of whether the air is heated or cooled.

Each of the main duct outlets is disposed above a door between the room in which that duct is disposed in the common hallway 63. A gap between the bottom of the door and the floor of the room functions as an air return path by means of which air entering that room from main duct 10 flows into hallway 63. Air returning into the central hallway from the various rooms enters into a main duct inlet leading to a blower unit 100 of the air conditioning system, indicated by dotted lines. Dotted lines 61 represent flow of air from hallway 63 into the inlet of main blower 100, and dotted line 62 represents air flowing from the outlet of main blower 100 into main duct 10. Thus, the central air conditioning system produces circulation of air through main duct 10 into the respective rooms, back into the main hallway, and into the main blower unit 100.

A first air filter unit 27 is attached to cover main duct outlet 12 in room 6. Air filter unit 27 includes a housing having side walls 31 and a top and bottom sealably attached to side walls 31. A front door 32 is hingeably connected by means of hinges 33 to sealably cover the front of the housing of air filter unit 27 when door 32 is closed and locked. When door 32 is open, a replaceable filter element 36 is exposed. Filter element 36 can include a sheet of porous paper, such as commonly available paper towel material, disposed against a rigid piece of retaining screen or mesh. An electric blower unit 40 has an outlet 41 attached to one of side walls 31, which has an outlet opening 39 therein. A vertical wall 35 extending from the bottom to the top of filter unit 27 in cooperation with filter element 36 produces an enclosed region within which blower unit 40 is disposed. Air entering filter unit 27 can only enter the air inlet of blower 40 by first passing through filter element 36. Arrows 34 indicate the path through which air from duct outlet 12 flows through filter element 36 and into the intake of blower unit 40. Arrows 37 indicate the flow of air from the outlet of blower unit 40 through opening 39 in side wall 31 into the interior of room 6. This air ultimately returns to hallway 63 and the inlet of main blower unit 100, in the manner previously described through a door between hallway 63 and room 6.

It can be seen that blower unit 40 continually blows a relatively constant quantity of filtered air into the interior of room 6, causing the air pressure in room 6 to be slightly higher than in main hallway 63. The pressure in room 6 is higher than in hallway 63 if main blower unit 100 is forcing air through main duct 10 in a direction indicated by arrow 60. The pressure in room 6 produced by blower 40 is also greater than the air pressure in hallway 63 if main blower 100 is not operating. Consequently, air carrying dust and other allergy producing particles is substantially prevented from entering room 6 via any opening therein when air filter unit 27 is operating due to the increased air pressure in room 6. This is especially true if the door between hallway 63 and room 6 is closed.

In one embodiment of the invention, blower unit 40 is a Dayton Model 4C004A, having approximately 1/40 of a horsepower. The height of air filter unit 27 is approximately eight inches, the depth is approximately 18 inches, and the width is approximately 24 inches.

Filter element 36 includes a single layer of ordinary household paper towel material disposed over a rigid screen mesh, extending between side wall 31 and partitioned wall 35. For this embodiment of the invention, persons who previously suffer from allergic reactions to dust, pollen and the like have ceased to have such allergic reactions when the blower unit is installed over the air conditioning outlet into their bedrooms.

It has been found that in approximately two (2) days, a paper towel used as filter element 36 becomes heavily loaded with filtered dust particles in the inventor's house in Southern Arizona. The filter therefore must be carefully removed by folding the dirty side of the paper against itself as it is removed from the supporting screen.

The above-mentioned blower unit 40 shown in FIG. 1 and filter unit 27 blows approximately 120 cubic feet of filtered air per minute into room 6. This is found to be a sufficient quantity of air to maintain comfortable temperatures and suitable increased pressure in an average sized bedroom, thereby providing a comfortable, healthful environment for a person suffering from allergies due to pollens, dust, and other particles suspended in the air which they breath when sleeping.

The remaining air filter units 28 and 29 shown in FIG. 1 and the air filter unit shown in FIGS. 2-7, all operate on basically the same principles as air filter 27, described above. For example, air filter unit 29 in FIG. 1 differs from air filter unit 27 in that instead of having a front door which hingeably opens to expose a replaceable filter disposed in front of the blower unit, a housing 42 of air filter unit 29 is hingeably attached to a base plate mounted to the wall over main duct outlet 14. Filter element 51, which can have the same configuration as filter element 36 of air filter unit 27, is disposed over main duct outlet 14. As indicated by dotted line 42', housing 42, to which blower unit 45 is rigidly attached, swings outward in the direction indicated by arrow 43 to expose filter element 51, which can then be replaced.

In certain instances, the noise produced by a blower unit (such as blower units 40 and 45 referred to above) may be disturbing to a person who must sleep in a room with filtered air therein. In this event, it is possible to couple the outlet of a blower unit from an air filter unit mounted over a main duct outlet in a room remote from the room in which filtered air is desired through a tube extending through the main duct to a main duct outlet into the room in which the filtered air is desired. Air filter unit 28 in FIG. 1 discloses one way of implementing this concept. More specifically, air filter unit 28 is disposed over main duct outlet 13 opening into room 8. Air is drawn by means of blower 54 into the interior of air filter unit 28 and through filter element 52 into the air inlet of blower 54 along the path indicated by arrows 121. The outlet of blower unit 54 is connected by means of tubular coupling 55 to a flexible tubular conduit 56 which extends back into main duct 10 through main duct outlet 13. Flexible tube 56 extends along the main channel of main duct 10 to an outlet connection 57. Filtered air from the outlet of blower unit 54 flows out of coupling element 57 into the interior of room 5, as indicated by arrows 58 and eventually returns into hallway 63, as indicated by arrows 59. It should be noted that end element 57' blocks air in main duct 10 from flowing into room 5, so that only filtered air in flexible tube enters room 5. As in the previously described embodiments of the invention, air filter unit 28 has a door 49 which can be opened to allow replacement of filter element 52. A flapper valve 48' in wall 48 of air filter unit 28 allows some of the unfiltered air flowing through duct outlet 13 into air filter unit 28 to flow into room 8, the rest of the air flowing through duct outlet 13 into air filter unit 28 being drawn through filter element 52 into the air inlet of blower unit 54 and into flexible hose 56.

In FIG. 1, reference numeral 24 designates a vent which is disposed over main duct opening 11 into room 7. Arrows 30 indicate air being blown out of duct opening 11 into room 7 and arrows 31 indicate the return path through a door (not shown) beneath vent 23 into hallway 63.

Figure 2:
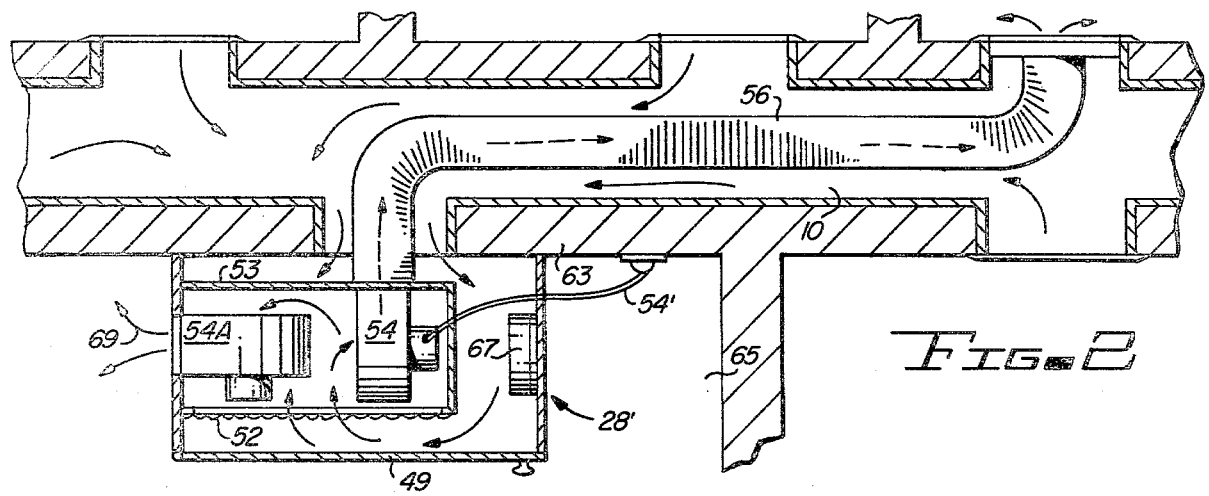
FIG. 2 is a section view diagram illustrating another embodiment of the air filtering system of the present invention.

FIG. 2 shows an air filter unit 28' similar to air filter unit 28 in FIG. 1. However, filter unit 28' of FIG. 2 includes a second blower 54A enclosed within a compartment bounded by divider panel 53 and filter element 52 along with blower unit 54. Air drawn through filter element 52 by blowers 54A and 54 is drawn into the respective air inlets of those blowers. As shown in FIG. 1, the air outlet of blower 54 connected to flexible tube 56, which extends through main ducts 10 into a different room. However, the outlet of blower 54A is connected to an outlet in the side of the housing of air filter 28', blowing filtered air into the room in which air filter unit 28' is installed, as indicated by arrows 69. In FIG. 2, electric cord 54' is shown connected directly into a conventional electrical outlet to emphasize that blower 54 operates continuously regardless of whether the main blower of the central air conditioning system is operating.

Figures 3, 4:
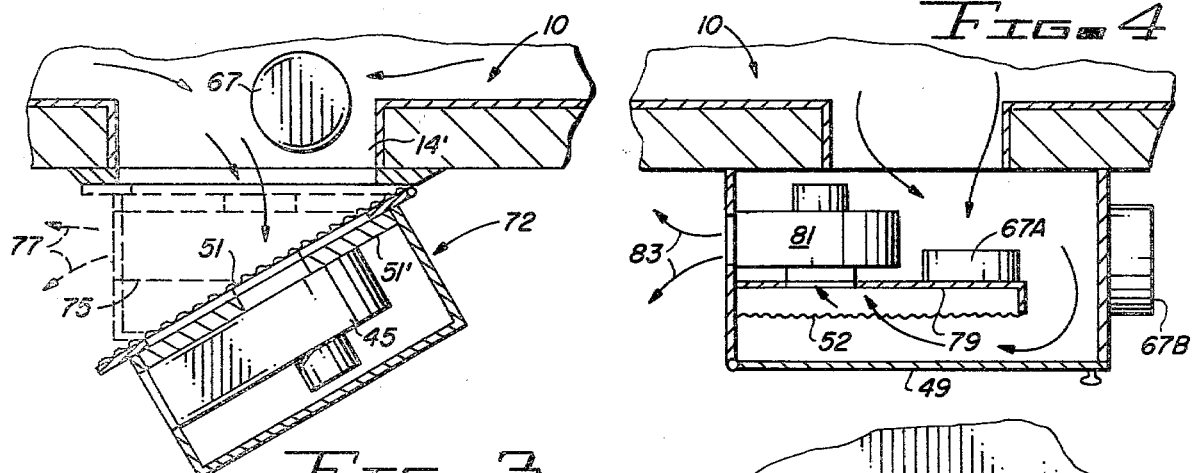
FIG. 3 is a section view illustrating another embodiment of the air filtering system of the present invention.
FIG. 4 is a partial section view diagram illustrating another embodiment of the air filtering system of the present invention.

In the embodiment of the invention showing FIG. 3, air filter unit 72 is very similar to air filter unit 29 shown in FIG. 1, except that blower 45 swings outward with the housing of air filter unit 72 and filter element 51 is placed against a plate 51' against which the air inlet of blower unit 45 is disposed. In FIG. 3, a smoke alarm 67 is disposed in main duct adjacent duct outlet opening 14'.

In FIG. 2, a smoke alarm unit 67 is attached to an inner wall of the housing of air filter unit 28'. This results in rapid conducting of any smoke generated anywhere in the house through main duct 10 into air filter 28', even if the main blower of the central air conditioning system connected to main duct 10 is not operating. This is due to the fact that blowers 54 and 54A draw air into main duct 10 from all rooms in the building, when the main blower unit (blower unit 100 in FIG. 1) is not operating. The disclosed smoke alarm system has been found to produce an alarm signal within ten to fifteen seconds after a significant amount of smoke has been produced in any other room of a house, when the main blower (i.e., main blower 100) is off. This is a very important result, since ten or more minutes may elapse before smoke in a closed room in a house reaches a smoke alarm unit mounted in the hallway if the central air blower is not on. This is enough time to cause serious property damage or even loss of life.

In FIG. 4, a slightly modified embodiment of the air filter 27 in FIG. 1 is shown. However, blower 81 is mounted behind (rather than in front of) a vertical divider plate 79 having an inlet opening therein connected to the air intake of blower 81. Replaceable filter 52 is disposed along the front of divider plate 79 and spaced therefrom. A smoke detector alarm unit 67A is attached to the rear surface of divider plate 79 along side blower unit 81, providing rapid and reliable detection of smoke generated in any room of the house connected to main duct 10, except the room in which the air filter unit of FIG. 4 is installed. Smoke detector unit 67B is attached to the outside of the air filter unit of FIG. 4 in order to provide rapid detection of smoke produced by fire in the room in which the air filter unit of FIG. 4 is installed.

Figure 5:
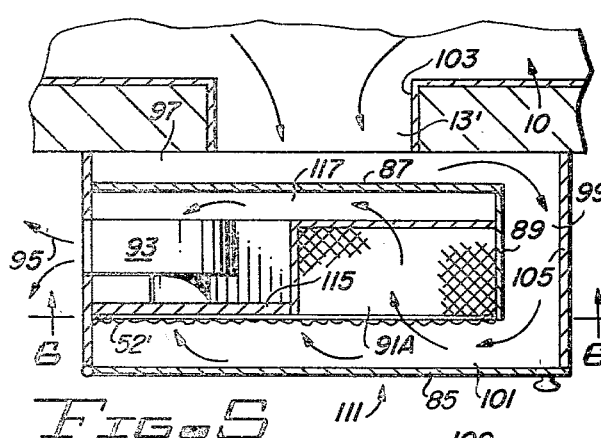
FIG. 5 is a section diagram illustrating another embodiment of the air filtering system of the present invention.
Figure 6:
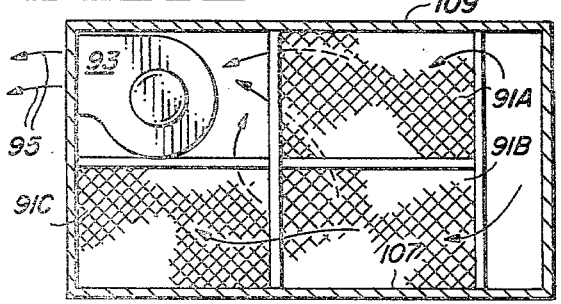
FIG. 6 is a sectional view taken along section line 6—6 of FIG. 5.
Figure 7:
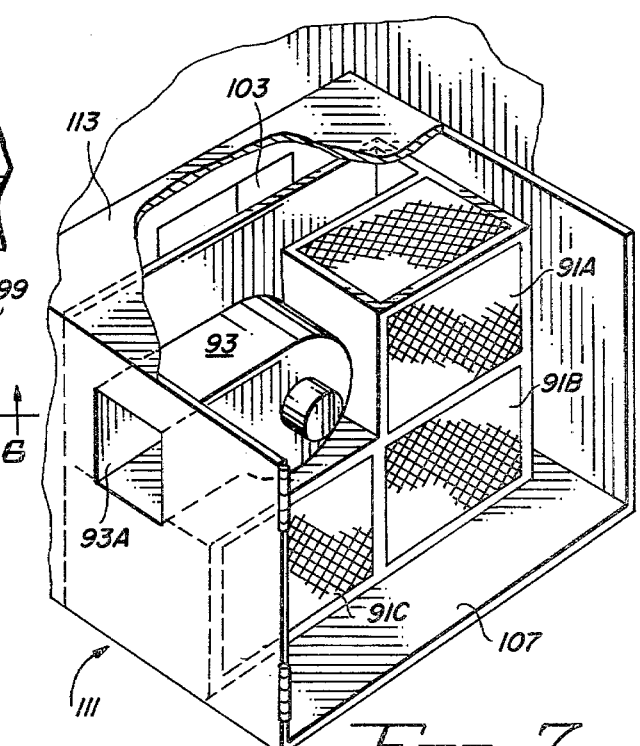
FIG. 7 is a partial cutaway perspective view illustrating the embodiment of the invention shown in FIGS. 5 and 6.

FIGS. 5-7 disclose an embodiment of the invention wherein a plurality of absolute filters are utilized to produce extremely pure air by filtering air blown from main duct 10. Various absolute filters capable of producing air which is 99.97% pure is capable from various manufacturers. For example, three (3) MSA Model 82177 filters (referred to as "99.97 percent filters") can be utilized to provide the three absolute filters 91A, 91B and 91C shown in FIGS. 5-7.

As best seen in FIGS. 5 and 7, a blower 93 and three (3) absolute filters 91A, 91B and 91C are enclosed in an enclosure bounded by vertical partitions 87 and 89 and pre-filter element 52', all of which extend from the floor 107 to the top 113 of air filter unit 111. Thus, all air exhausted through the air outlet of blower 93 (indicated by arrows 95 in FIGS. 5 and 6) is drawn through pre-filter element 52' (which can be implemented by means of porous paper towel material or the like placed against a retaining screen) and the three (3) absolute filters 91A, 91B and 91C into the compartment 117 located behind the three (3) absolute filters. A front plate 115 (FIG. 5) prevents any of the air drawn by pre-filter element 52' from passing through the quadrant in which blower 93 is mounted, thereby causing all air which passes through pre-filter element 52' to pass through the three (3) absolute filters 91A, 91B and 91C. The filtered air in region 117 is drawn into air inlet of blower 93 and out of an air outlet thereof, as indicated by the arrows in FIGS. 5 and 6.

Figure 8:
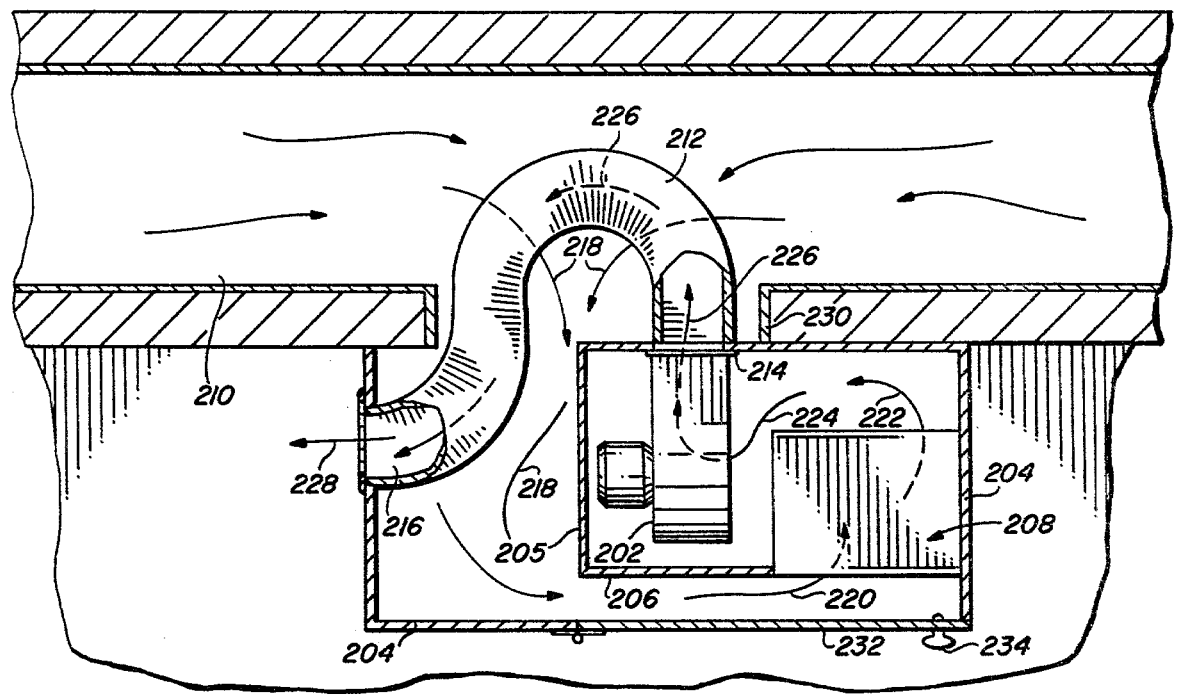
FIG. 8 is a section view diagram illustrating another embodiment of the invention.
Figure 9:
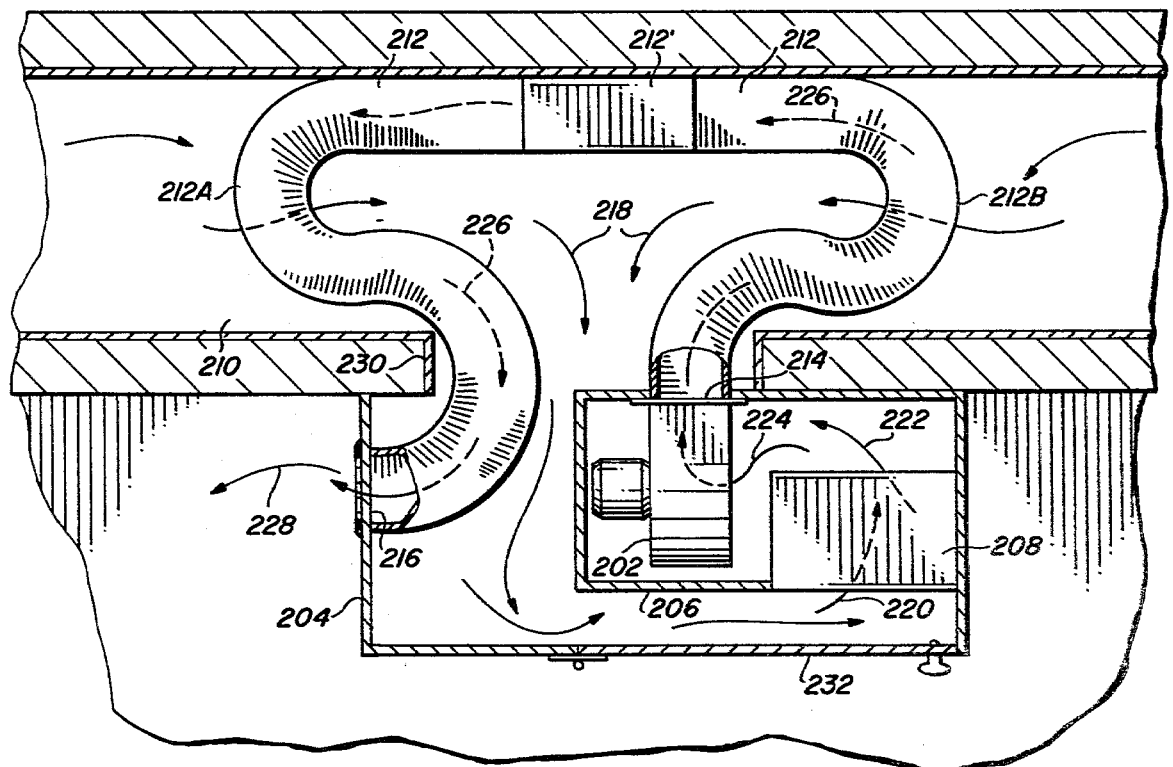
FIG. 9 is a section view diagram illustrating yet another embodiment of the invention.

FIGS. 8 and 9 illustrate two additional embodiments of the invention wherein a duct 212, which may be similar to ducts 56 in FIG. 1 and FIG. 2, described above, extends from the outlet 214 of blower 202 through main duct opening 230 for a distance into main duct 210 and then loops to return back through main duct opening 230 into housing 204. Housing 204 contains both blower unit 202 and a filter unit 208. The end of duct 212 which returns through main duct opening 230 into housing 204 extends to air outlet 216. (Note that reference number 208 designates any type of suitable filter element, such as an absolute filter element or the paper type filter elements previously described herein.)

The operation of the air filtering system shown in FIGS. 8 and 9 is similar to the operation described for the previously mentioned embodiments of the invention. Blower unit 202 causes unfiltered air to be drawn from main duct 210 into housing 204, as indicated by arrows 218. Filter 208 and blower 202 are enclosed in an interior section of housing 204 bounded by walls 206 and outer walls of housing 204, so that air drawn into the inlet of blower 202 first passes through filter element 208, as indicated by arrows 220, 222, and 224.

The air drawn into the inlet of blower 202 is forced out of the outlet 214 thereof into one end of tube 212. In FIG. 8, tube 212 simply extends through main duct opening 230 into the interior of main duct 210 and forms a U-shaped path that returns through main duct opening 230 to air outlet 216. The air is then forced out of ducts 212 through air outlet 216 into the same room in which housing 204 is installed, as indicated by arrows 228. Provision of the above-described U-shaped path obtained by extending tube 212 into main duct 210 greatly muffles and reduces the level of noise produced by blower 202. In the configuration shown in FIG. 9, a substantially larger portion of duct 212 extends into main air conditioning duct 210, further muffling the noise produced by blower 202. Reference number 212' designates a suitable muffling device connected between right and left sections of duct 212.

The embodiments of the invention shown in FIGS. 8 and 9 allow convenient installation in a single room of an air filter unit which operates in accordance with the foregoing principles. The units, when operating, do not produce a sufficiently high level of noise in the room to annoy or disturb the sleep of a person sleeping in that room.

The embodiments of FIG. 8 (and FIG. 9) can be modified in accordance with the air filter unit 28 of FIG. 1, wherein first and second housings, with blower units and filters therein are used in different rooms. A first duct extends through the main air conditioning duct from the air outlet of the blower in the first housing to the air outlet in the second housing, and a second duct extends through the main air conditioning duct from the air outlet of the blower in the second housing to the air outlet in the first housing. This arrangement provides relatively quiet operation of both systems, because the long ducts muffle most of the noise which results from the air outlets of the two blower units.

The above-described air filtering systems have the advantage that they not only maintain highly pure and filtered air in a particular room of a building, but they also tend to substantially reduce the level of particulates and pollution in air throughout the building, thereby benefiting all persons in the building.

It is known that air conditioning systems are alternately turned on and off. The above-described air filtering systems, by continuously circulating air through such ducts, recover a significant portion of the heat energy which is otherwise lost when the main air conditioning system is temporarily turned off by a thermostatic control system.

The above-described embodiments of the invention have been found to provide a highly efficient air filtering system. A single filter unit of the types described is capable of filtering the entire volume of air in a typical house from 10 to 15 times per day, and of changing the air in a particular room every 10 to 12 minutes.

It should be noted that part of the efficiency of the filtering devices described herein is due to the fact that they move the air through a building at a relatively slow rate, thereby avoiding churning and mixing of air produced by high velocity air streams produced by main blowers of ordinary air conditioning systems.

It should be noted that the described embodiments of the invention are easily installed in any reasonably modern home having a central air circulation system.

Although the invention has been described with reference to several particular embodiments thereof, those skilled in the art will be able to make various modifications to the disclosed structure and method without departing from the true spirit and scope of the invention, as set forth in the appended claims.

I claim:

1. In a building including
   i. a first room and a central air circulation duct system,
   ii. a first duct outlet connected to said central air circulation duct system positioned to effect guiding of air in said central air circulation duct system into the first room, and
   iii. a main blower connected to said central air circulation duct system for forcing air through said central air circulation duct system,
   and an air filtering device comprising in combination:
   a. an electric blower having an air inlet and an air outlet;
   b. housing means supporting said electric blower and having means for defining a path for air flow from said first duct outlet to said air inlet of said electric blower, said housing means having an air outlet in communication with said air outlet of said electric blower to cause air passing through said electric blower to be blown into said first room; and
   c. first filtering means disposed in said housing means between said first duct outlet and said air inlet of said electric blower for filtering all of the air passing into said air inlet of said electric blower.

2. In said building of claim 1 wherein said air filtering device further includes electrical coupling means for continuously supplying electrical power to said electric blower regardless of whether the main blower is operating.

3. In said building of claim 2 wherein said first filtering means is replaceable, and wherein said housing means further includes opening means for allowing access to said first air filtering means to allow convenient removal and replacement of said first air filtering means.

4. In said building of claim 3 wherein said first filtering means includes a sheet of filter paper material.

5. In said building of claim 3 wherein said housing means includes a housing having a top, a bottom, two sides attached to said top and said bottom, said opening means including a front door openable to expose said first filtering means and closeable to prevent air from escaping from said housing means.

6. In said building of claim 3 further including second filter means disposed in said housing means between said first filter means and the air inlet of said electric blower, said first filter means functioning as a pre-filter.

7. In said building of claim 6 wherein said second filter means includes an absolute filter.

8. In said building of claim 2 further including a first smoke alarm device disposed in said housing means for producing an alarm signal in response to a predetermined concentration of smoke in air passing into said housing means from the first duct outlet.

9. In said building of claim 8 further including a second smoke alarm device mounted in said first duct to rapidly produce an alarm signal in response to a predetermined concentration of smoke in the first room.

10. In said building of claim 1 further including means disposed between the air outlet of said electric blower and said air outlet of said housing means for muffling noise produced by said electric blower 11. In said building of claim 10 wherein said muffling means includes a tube which extends from the outlet of said electric blower through said first duct outlet into said duct system, said tube looping back through said first duct outlet to said air outlet of said housing means.

12. A method of providing a flow of filtered air into a room of a building, said building having a central air circulation system including a main duct, said method comprising the steps of:
   a. steadily drawing unfiltered air only from the main duct of said central air circulation system in the building through a filter by means of an electric blower, regardless of whether the main blower for circulating air through said central air circulation system is operating;
   b. preventing any unfiltered air from flowing through the main duct of said central air circulation system directly into the room; and
   c. forcing enough of said unfiltered air through said filter into the room to increase the relative pressure in the room to a level such that no more than a negligible amount of unfiltered air enters the room via any openings into the room.

13. A method of providing a flow of filtered air into a room of a building, said building having a central air circulation system including a main duct, said method comprising the steps of:
   a. steadily drawing unfiltered air only from the main duct of said central air circulation system by means of an electric blower both when a main blower for circulating air through said central air circulation system is on and when the main blower is off;

b. causing said unfiltered air to pass through a filter by means of the electric blower;
c. preventing any unfiltered air from flowing through the main duct of said central air circulation system directly into the room; and
d. forcing enough of said unfiltered air passing through said filter into the room to increase the relative pressure in the room to a level such that no more than a negligible amount of unfiltered air enters the room via any openings, such as doors or windows of the room.

14. In a building including
i. a first room and a central air circulation duct system,
ii. a first duct outlet connected to said central air circulation duct system and to the first room, said first duct outlet being positioned to effect guiding of air in said central air circulation duct system into the first room, and
iii. a main blower connected to said central air circulation duct system for forcing air through said central air circulation duct system, and an air filtering device comprising in combination:
a. an electric blower having an air inlet and an air outlet;
b. housing means supporting said electric blower and having means for defining a path for air flow from said first duct outlet to said air inlet of said electric blower, said housing means having an air outlet in communication with said air outlet of said electric blower to cause air passing through said electric blower to be blown through said air outlet of said housing means into said first room; and
c. filtering means disposed in said housing means adjacent to said electric blower for filtering substantially all of the air passing through said electric blower.

15. In a building including
i. a first room, a second room, and an air circulation duct system,
ii. a first duct outlet for guiding air in the air circulation duct system into the first room,
iii. a second duct outlet for guiding air in the air circulation duct system into the second room, and
iv. a main blower for forcing air through said air circulation duct system, and an air filtering device comprising in combination:
a. an electric blower having an air inlet and an air outlet;
b. housing means supporting said electric blower and having means for defining a path for air flow from said first duct outlet to said air inlet of said electric blower;
c. filtering means disposed in said housing means between said first duct outlet and said air inlet of said electric blower for filtering all of the air passing into said air inlet of said electric blower;
d. an air tube in communication with said air outlet of said electric blower and extending through said first duct outlet and through a portion of said air circulation duct system to said second duct outlet; and
e. means in communication with the second end of said air tube for directing air flowing in said air tube through said second duct outlet into said second room and preventing air, other than said air flowing through said air tube, in said central air circulation duct system from flowing into said second room.

* * * * *